(12) United States Patent
Lee et al.

(10) Patent No.: US 11,736,046 B2
(45) Date of Patent: Aug. 22, 2023

(54) APPARATUS FOR CONTROLLING MOTOR AND METHOD FOR CONTROLLING MOTOR

(71) Applicant: LG ELECTRONICS INC., Seoul (KR)

(72) Inventors: Ki Wook Lee, Seoul (KR); Ha Min Song, Seoul (KR); Kwang Sik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/565,908

(22) Filed: Dec. 30, 2021

(65) Prior Publication Data

US 2022/0216814 A1 Jul. 7, 2022

(30) Foreign Application Priority Data

Jan. 5, 2021 (KR) ........................ 10-2021-0000733

(51) Int. Cl.
| | |
|---|---|
| *H02P 23/12* | (2006.01) |
| *H02P 6/22* | (2006.01) |
| *H02P 6/182* | (2016.01) |
| *D06F 37/30* | (2020.01) |
| *D06F 34/08* | (2020.01) |
| *H02K 11/225* | (2016.01) |

(52) U.S. Cl.
CPC ................ *H02P 6/22* (2013.01); *D06F 34/08* (2020.02); *D06F 37/304* (2013.01); *H02K 11/225* (2016.01); *H02P 6/182* (2013.01)

(58) Field of Classification Search
CPC .. H02P 6/22; H02P 6/182; H02P 21/32; H02P 27/06; H02K 11/225; D06F 34/08; D06F 37/304
See application file for complete search history.

(56) References Cited

U.S. PATENT DOCUMENTS

| 9,765,468 B2 | 9/2017 | Kim et al. |
| 2020/0228039 A1 | 7/2020 | Kim et al. |

FOREIGN PATENT DOCUMENTS

| GB | 2196194 A | * 4/1988 | ........... D06F 37/304 |
| KR | 10-2015-0053559 | 5/2015 | |
| KR | 10-2020-0087604 | 7/2020 | |

* cited by examiner

*Primary Examiner* — Karen Masih
(74) *Attorney, Agent, or Firm* — KED & Associates LLP

(57) ABSTRACT

Disclosed is a motor control apparatus including an inverter part configured to convert DC power into AC power and provide the AC power to a motor, and a controller configured to control driving of the motor by using the inverter part, the controller configured to identify a stop position of a rotor in previous driving of the motor, and control the inverter part to apply an input signal of a specific pattern to the motor according to a start of driving the motor, wherein a phase of the input signal of the specific pattern is determined on the basis of the stop position of the rotor. Other example embodiments may be provided.

20 Claims, 10 Drawing Sheets

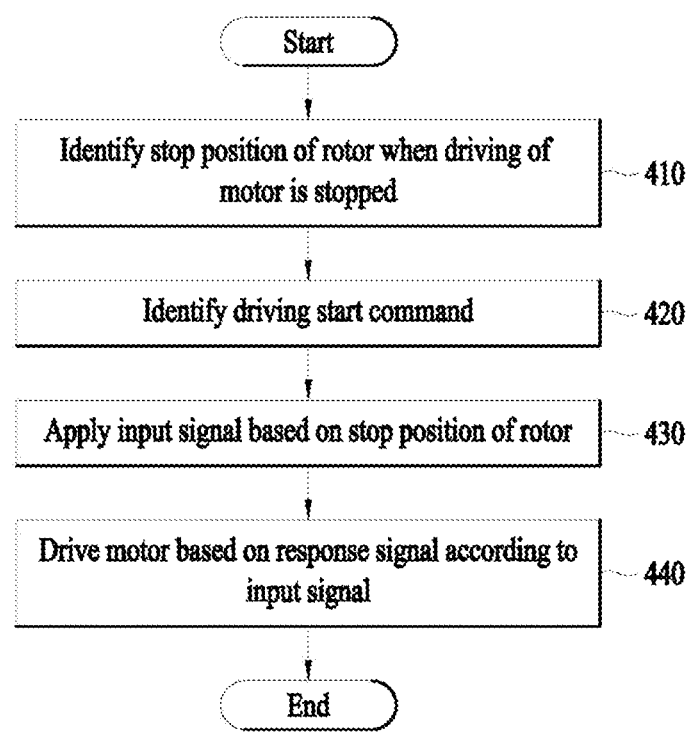

APPARATUS FOR CONTROLLING MOTOR AND METHOD FOR CONTROLLING MOTOR

CROSS-REFERENCE TO RELATED APPLICATION

This application claims the benefit of Korean Patent Application No. 10-2021-0000733, filed in Korea on Jan. 5, 2021, in the Korean Intellectual Property Office, the disclosure of which is incorporated herein in its entirety by reference.

BACKGROUND

1. Field

The present disclosure relates to a motor control apparatus and a motor control method and one particular implementation relates to a motor control apparatus and a motor control method for estimating a position of a rotor when starting a motor.

2. Background

According to an operation principle for motors used in home appliances, current may be smoothly controlled merely when exact positions of rotors are identified. For example, when an initial position of a motor (rotor) is not accurately checked, starting torque may be smaller or a rotation direction of the motor may reverse, and thus it is necessary to detect first the initial position of the motor before starting the motor and control the motor on the basis of initial position information.

In order to obtain the initial position information of the motor as described above, in the related art, a method of using sensors such as encoders, resolvers, and hall sensors has been applied, but such method of using sensors requires expensive parts, and wirings or structures are complicated such that usage environment thereof is limited. Thus, sensorless control not using position detection devices has been actively studied.

In this regard, in a related art 1 (Korean Patent Application Publication No. 10-2020-0087604), there is disclosed a configuration for estimating motor resistance by sensorless control by applying 12 signals for 2-point operation.

Further, in a related art 2 (Korean Patent Application Publication No. 10-2015-0053559), there is disclosed a configuration for efficiently detecting a voltage applied to a motor in a sensorless laundry treatment machine.

However, in such related arts, a method in which, when the motor starts to move, a specific current is applied to a stator to directly align a position of a rotor was applied, and thus, a predetermined waiting time for aligning the position may be required each time starting the motor. In addition, the greater the inertia of an object to be driven using the motor, the greater the waiting time required to align the position, and thus a net acting ratio of a washing machine may decrease and user dissatisfaction may be caused.

BRIEF DESCRIPTION OF THE DRAWINGS

Arrangements and embodiments may be described in detail with reference to the following drawings in which like reference numerals refer to like elements and wherein:

FIG. 10 is a schematic flowchart of a motor control method according to an example embodiment of the present disclosure.

DETAILED DESCRIPTION

Terms used in example embodiments are general terms that are currently widely used while their respective functions in the present disclosure are taken into consideration. However, the terms may be changed depending on intention of one of ordinary skilled in the art, legal precedents, emergence of new technologies, and the like. Further, in certain cases, there may be terms arbitrarily selected by the applicant, and in this case, the meaning of the term will be described in detail in the corresponding description. Accordingly, the terms used herein are not to be construed simply as its designation but based on the meaning of the term and the overall context of the present disclosure.

Throughout the specification, when a part is referred to as including a component, unless particularly defined otherwise, it means that the part does not exclude other components and may further include other components. Further, terms " . . . er (or)," " . . . part," " . . . module," and the like refer to an element that processes at least one function or operation, which may be implemented in hardware or software or implemented in a combination of hardware and software.

The expression "at least one of a, b, and c," need to be understood as including merely a, merely b, merely c, both a and b, both a and c, both b and c, or all of a, b, and c.

Example embodiments of the present disclosure that are easily performed by those skilled in the art will be described in detail below with reference to the accompanying drawings. The present disclosure may, however, be implemented in many different forms and need not to be construed as being limited to the example embodiments described herein.

Hereinafter, example embodiments of the present disclosure will be described in detail with reference to the drawings.

Figure 1:
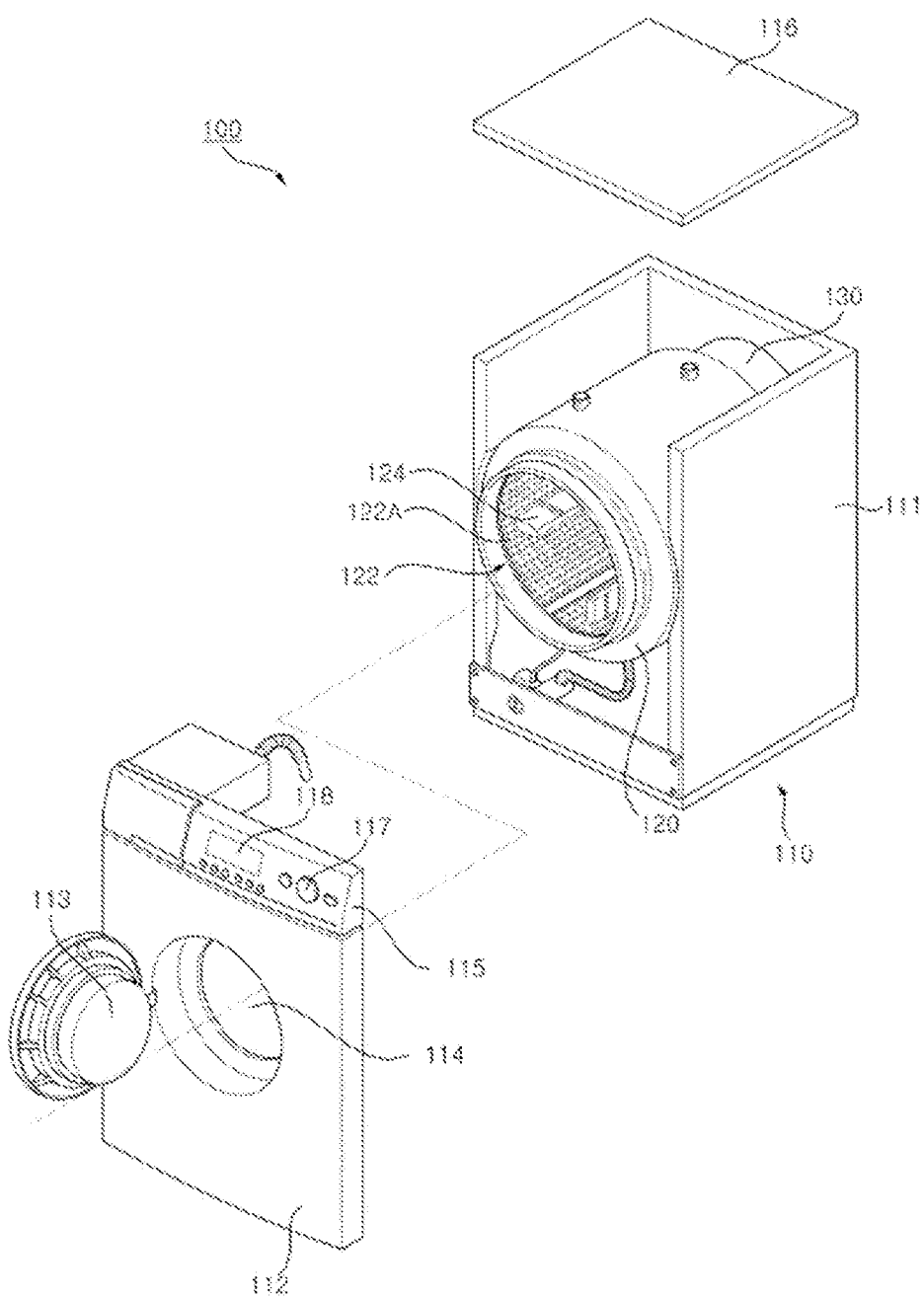
FIG. 1 is a schematic exploded perspective view of a clothes treating apparatus according to an example embodiment of the present disclosure.

FIG. 1 is a diagram illustrating a clothes treating apparatus according to an example embodiment of the present disclosure.

Referring to FIG. 1, a clothes treating apparatus 100 according to various example embodiments may include a drum type clothes treating apparatus in which cloth is inserted into a washing tub (for example, a drum 122) open in the front thereof. Meanwhile, the clothes treating apparatus is not limited to such a structure, and a clothes treating apparatus according to another example embodiment may include a full-automatic clothes treating apparatus in which cloth is inserted into a washing tub open in an upper surface direction thereof, unlike the one shown in FIG. 1. The clothes treating apparatus 100 may correspond to an apparatus that performs at least one of washing, rinsing, dehydrating, and drying on the cloth inserted into the washing tub.

For example, the clothes treating apparatus 100 may include at least one of a cabinet 110 forming an exterior thereof, a tub 120 disposed inside the cabinet 110 and supported by the cabinet 110, a drum 122, which is disposed inside the tub 120 and in which cloth is inserted and washed, a motor 130 configured to drive the drum 122, a washing water supply device (not shown) disposed outside a cabinet body 111 and configured to supply washing water to the inside of the cabinet 110, and a drainage device (not shown) formed on a lower side of the tub 120 and configured to discharge the washing water to the outside.

The drum 122 may include a plurality of through holes 122A through which washing water passes, and may also include a lifter 124 disposed on an inner side surface of the drum 122 such that laundry is lifted to a certain height when the drum 122 rotates and then dropped due to gravity.

The cabinet 110 may include a cabinet body 111, a cabinet cover 112 that is disposed on the front of the cabinet body 111 and combined with the cabinet body 111, a control panel 115 that is disposed on an upper side of the cabinet cover 112 and combined with the cabinet body 111, and a top plate 116 that is disposed on an upper side of the control panel 115 and combined with the cabinet body 111.

The cabinet cover 112 may include a cloth entrance hole 114 through which cloth enters or exits, and a door 113 disposed to be rotatable to the left and right such that the cloth entrance hole 114 may be open and closed.

The control panel 115 may include operation keys 117 for operating operation states of the clothes treating apparatus 100, and a display 118 disposed on one side of the operation keys 117 and configured to display the operation states of the clothes treating apparatus.

The operation keys 117 and the display 118 disposed in the control panel 115 may be electrically connected to a controller (for example, controller 210 in FIG. 2), and the controller may electrically control each of constituent elements of the clothes treating apparatus 100. Details of the operation of the controller will be described below. Although not shown in the drawing, the clothes treating apparatus 100 may further include various sensors and other devices. For example, the clothes treating apparatus may further include a vibration sensor for measuring the amount of vibration of the drum 122, or may further include a device for detecting and reducing vibration generated according to the amount of eccentricity of cloth accommodated in the drum 122.

Figure 2:
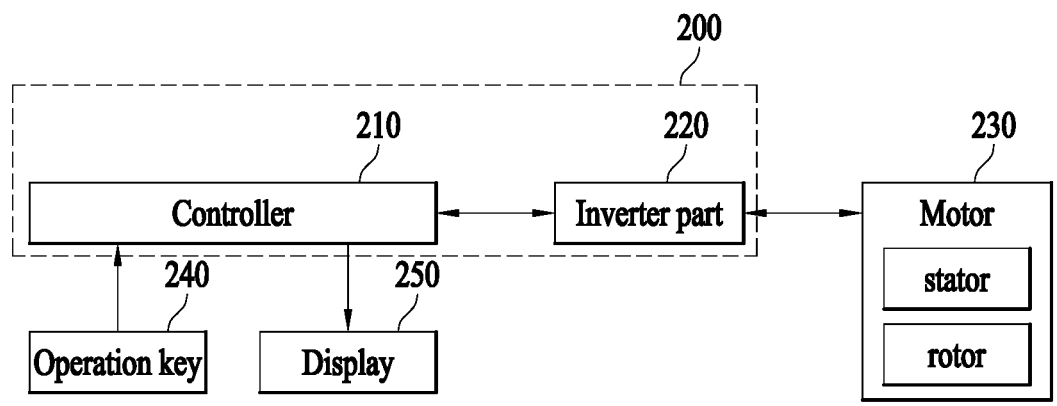
FIG. 2 is a schematic configuration block diagram of a clothes treating apparatus including a motor control apparatus according to an example embodiment of the present disclosure.

FIG. 2 is a schematic configuration block diagram of a clothes treating apparatus including a motor control apparatus according to an example embodiment of the present disclosure.

Referring to FIG. 2, a clothes treating apparatus according to various example embodiments may include at least one of a motor control apparatus 200, a motor 230 (for example, the motor 130 of FIG. 1), an operation key 240, and a display 250.

The motor control apparatus 200 may include a controller 210 and an inverter part 220 as components for overall controlling the driving of the motor 230.

According to various example embodiments of the present disclosure, instead of separately having a Hall sensor for detecting a position of a rotor of the motor 230, the motor control apparatus 200 may correspond to an apparatus that controls the driving of the motor 230 by estimating the position of the rotor of the motor 230 by applying an input signal and checking a response signal according to the input signal as a sensorless method.

For example, the motor 230 controlled by the motor control apparatus 200 may include a stator and a rotor, and a three-phase motor in which the rotor rotates as alternating current (AC) power of a predetermined frequency is applied to a coil of the stator.

For example, the motor 230 may include a surface-mounted permanent magnet synchronous motor (SMPMSM), an interior permanent magnet synchronous motor (IPMSM), and a synchronous reluctance motor (Synrm).

The inverter part 220 is a configuration for driving the motor 230, and may be an inverter configured to receive direct current (DC) power from the outside, convert the DC power into AC power, and provide the converted AC power to the motor 230, or may correspond to a configuration at least including the inverter.

For example, the inverter may include a plurality of inverter switching elements, and convert smoothed DC power into three-phase AC power having a predetermined frequency according to an on/off operation of the switching element, and output the three-phase AC power to the motor 230. For example, the switching elements in the inverter may control the on/off operation of each of the switching elements on the basis of an inverter switching control signal received from the controller 210, and accordingly, the AC power corresponding to a predetermined target frequency may be output to the motor 230.

The controller 210 may control a driving operation of the motor 230 using the inverter part 220. For example, the controller 210 may control the driving of the motor 230 by controlling a switching operation of the inverter part 220 and may rotate a washing tub (or a drum (for example, the drum 122 of FIG. 1)) according to the driving of the motor 230.

For example, the controller 210 may acquire a driving start command for the motor 230 or a driving stop command for the motor 230 on the basis of a user input related to a washing operation such as washing, rinsing, dehydrating, or drying received using the operation key 240, and accordingly, the controller 210 may perform a driving control operation of the motor 230.

Further, the controller 210 may control such that operation state information associated with washing operations such as a washing course, a washing time, a dehydration time, or a rinsing time is displayed through the display 250.

For example, when the driving stop command for the motor 230 is input, the controller 210 may check a stop position of the rotor in response that a speed of the rotor is less than or equal to a specified magnitude (for example, revolutions per minute (rpm)). According to an example embodiment, the controller 210 may apply an input current of a predetermined phase, which allows the rotor to be aligned in a specific position, so that the rotor is stopped at the specific position (for example, a position predicted to be the stop position of the rotor or a specific reference position). Accordingly, when the driving stop command is input, the rotor of the motor 230 is prevented from moving due to the movement of cloth or the rolling of water, and the rotor is aligned at the specific stop position, and thus the stop position of the motor 230 may be checked.

For example, when the driving start command for the motor 230 is input, the controller 210 may apply an input signal of a specific pattern to the motor 230 on the basis of information about the stop position of the motor 230 (for example, the rotor) directly before the driving start command is input. For example, the input signal of the specific pattern may include a plurality of sub-pattern signals having different phases, and the sub-pattern signals may correspond to a sine wave voltage signal of one period.

For example, the controller 210 may estimate a current (initial) position of the rotor on the basis of a response signal corresponding to the input signal, and may generate a driving control signal using the inverter part 220 to drive the motor 230 according to the estimated current position of the rotor.

For example, the controller 210 may determine a phase of the input signal applied to the motor 230 on the basis of a stop position of the rotor when the motor 230 is previously driven. For example, the controller 210 may determine a phase of a first sub-pattern signal to be initially applied among the plurality of sub-pattern signals included in the input signal on the basis of the stop position of the rotor of the previous driving operation. In addition, the controller 210 may determine phases of the remaining sub-pattern signals to be applied next according to the phase of the first sub-pattern signal. For example, the phase of the first sub-pattern signal may correspond to a phase opposite to the stop position of the rotor of the previous driving operation, and the phase of the sub-pattern applied next to the first sub-pattern signal may correspond to a phase having a phase difference of 120° or more (for example, about 120° or about 180°) from the first sub-pattern signal.

For example, the controller 210 may estimate the current position of the rotor on the basis of a magnitude of a sub-response signal (for example, a sine wave current signal of one period) corresponding to each of the plurality of sub-pattern signals (for example, each corresponds to a sine wave voltage signal of one period) included in the input signal and a phase of the sub-pattern signal corresponding to the sub-response signal having the largest magnitude.

Meanwhile, the controller 210 may estimate the position of the rotor and/or a parameter value (for example, a stator resistance) of the motor 230 on the basis of the response signal corresponding to the input signal.

Meanwhile, although not shown in the drawing, the motor control apparatus 200 according to an example embodiment may further include a memory for storing instructions related to a control command of the controller 210 or predetermined data related to the motor driving. For example, the motor control apparatus 200 may store information (data) about a stop position of the rotor when the driving of the motor 230 is stopped (or terminated) in the memory, and may apply an input signal (for example, an input voltage) of a specific pattern for checking a current position (for example, a position of the rotor directly before the driving start) of the rotor at a stage in which the driving of the motor 230 is started by using the stop position of the rotor.

Figure 3:
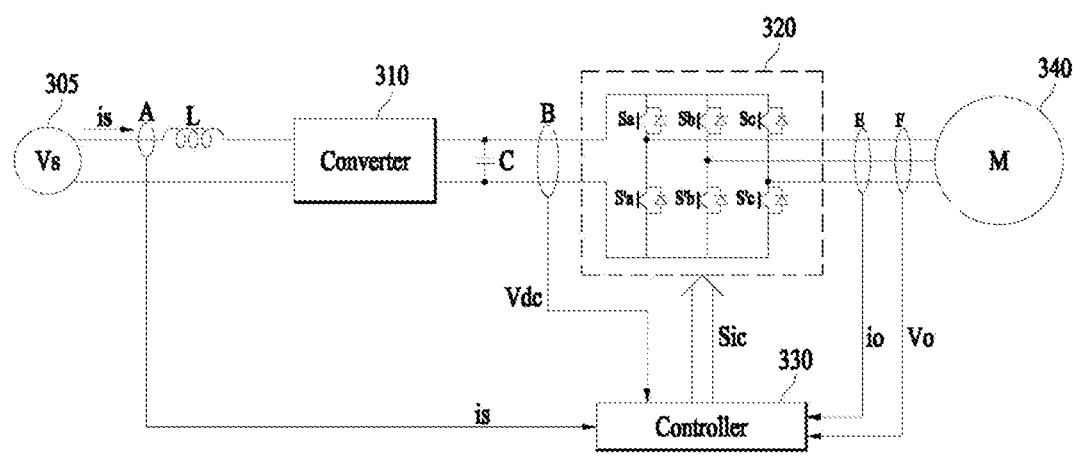
FIG. 3 is a diagram illustrating a clothes treating apparatus according to an example embodiment of the present disclosure.

FIG. 3 is a diagram illustrating a clothes treating apparatus according to an example embodiment of the present disclosure.

Referring to FIG. 3, a clothes treating apparatus (for example, the clothes treating apparatus 100 of FIG. 1) according to various example embodiments may include at least one of an AC power 305, a reactor L, a converter 310, a smoothing capacitor C, an inverter 320 (for example, the inverter part 220 of FIG. 2), a controller 330 (for example, the controller 210 of FIG. 2), and a motor 340 (for example, the motor 130 of FIG. 1, and the motor 230 of FIG. 2). In addition, the clothes treating apparatus may further include an input current detector A, a dc stage voltage detector B, an output current detector E, and an output voltage detector F.

Here, the reactor L may be disposed between an AC power 305 Vs and the converter 310, and may perform power factor correction or a step-up operation. In addition, the reactor L may also perform a function of limiting a harmonic current caused by high-speed switching of the converter 310.

The input current detector A may detect an input current is input from the AC power 305. To this end, a current transformer (CT), a shunt resistor, or the like may be used as the input current detector A. The detected input current may be input to the controller 330 as a pulse-type discrete signal.

The converter 310 may convert the AC power 305 through the reactor L into DC power and output the DC power. At this time, the AC power 305 may be a single-phase AC power or a three-phase AC power, and an internal structure of the converter 310 may be changed according to the type of the AC power 305. The converter 310 may include a diode or the like without including a switching element, and may perform a rectification operation without a separate switching operation. For example, four diodes of a bridge form may be used as the converter 310 in the case of single-phase AC power, and six diodes of a bridge form may be used as the converter 310 in the case of three-phase AC power. When the converter 310 includes a switching element, a step-up operation, a power factor improvement, and a DC power conversion may be performed by a switching operation of the switching element of the converter 310.

The smoothing capacitor C may smooth and store the input power. In FIG. 3, the smoothing capacitor C is illustrated as one element, but a plurality of the elements may be used to secure device stability. In addition, in FIG. 3, the smoothing capacitor C is illustrated as being positioned at an output terminal of the converter 310, but is not limited thereto, and DC power may be directly input to the smoothing capacitor C. The DC power is stored in the smoothing capacitor C, and thus both ends of the smoothing capacitor C may be referred to as a dc stage or a dc link stage.

The dc stage voltage detector B may detect a dc stage voltage Vdc at both ends of the smoothing capacitor C. The dc stage voltage detector B may include a resistance element, an amplifier, and the like. The detected dc stage voltage Vdc may be input to the controller 330 as a pulse-type discrete signal.

The inverter 320 (for example, the inverter part 220 of FIG. 2) includes a plurality of switching elements, converts the DC power ($V_{dc\_DC}$) smoothed by the on/off operation of the switching element into three-phase AC power ($V_a$, $V_b$, $V_c$) of a predetermined frequency, and outputs the converted three-phase AC power ($V_a$, $V_b$, $V_c$) to the motor 340. When each of upper-arm switching elements $S_a$, $S_b$, and $S_c$ being connected in series and each of lower-arm switching elements $S'_a$, $S'_b$, and $S'_c$ being connected in series form a pair, the inverter 320 may have a structure having a total of three pairs of upper and lower arm switching elements connected in parallel. Each of the switching elements $S_a$, $S'_a$, $S_b$, $S'_b$, $S_c$, and $S'_c$ may have a structure in which a diode is connected in parallel.

The switching elements in the inverter 320 may be controlled to be an on/off state on the basis of a control signal Sic from the controller 330. Accordingly, AC power having a predetermined frequency may be output to the motor 340. The control signal Sic is a switching control signal of a pulse width modulation (PWM) method, and may be generated and output based on an output current io detected by the output current detector E and an output voltage Vo detected by the output voltage detector F.

The controller 330 may control the switching operation of the inverter 320 on the basis of a sensorless method. To this end, the controller 330 may receive the output current io detected by the output current detector E and the output voltage Vo detected by the output voltage detector F.

The output current detector E may detect the output current io flowing between the inverter 320 and the motor 340. That is, current flowing through the motor 340 may be detected. In addition, the output current detector E may detect all of output currents ia, ib, and is of respective phases, or may detect output currents of two phases using a three-phase balance. The output current detector E may be positioned between the inverter 320 and the motor 340, and a current transformer (CT), a shunt resistor, or the like may be used to detect current. When a shunt resistor is used as the output current detector E, three shunt resistors may be positioned between inverter 320 and the motor 340, may be connected respectively, at one terminal thereof, to three lower arm switching elements $S'_a$, $S'_b$, and $S'_c$ of the inverter 320. In addition, two shunt resistors may also be used using a three-phase balance. In addition, when a single shunt resistor is used, the shunt resistor may be used between the capacitor C and the inverter 320. The detected output current io may be applied to the controller 330 as a pulse-type discrete signal, and the control signal Sic may be generated on the basis of the detected output current io.

The output voltage detector F is positioned between the inverter 320 and the motor 340, and may detect an output voltage that is applied to the motor 340 from the inverter 320. When the inverter 320 is controlled by a PWM-based switching control signal, the output voltage may be PWM-based pulse type voltage. The output voltage detector F may include a resistance element electrically connected between the inverter 320 and the motor 340, and a comparator connected to one end of the resistance element. The detected output voltage Vo may be applied to the controller 330 as a pulse-type discrete signal, and the control signal Sic may be generated on the basis of the detected output voltage Vo.

Figure 4:
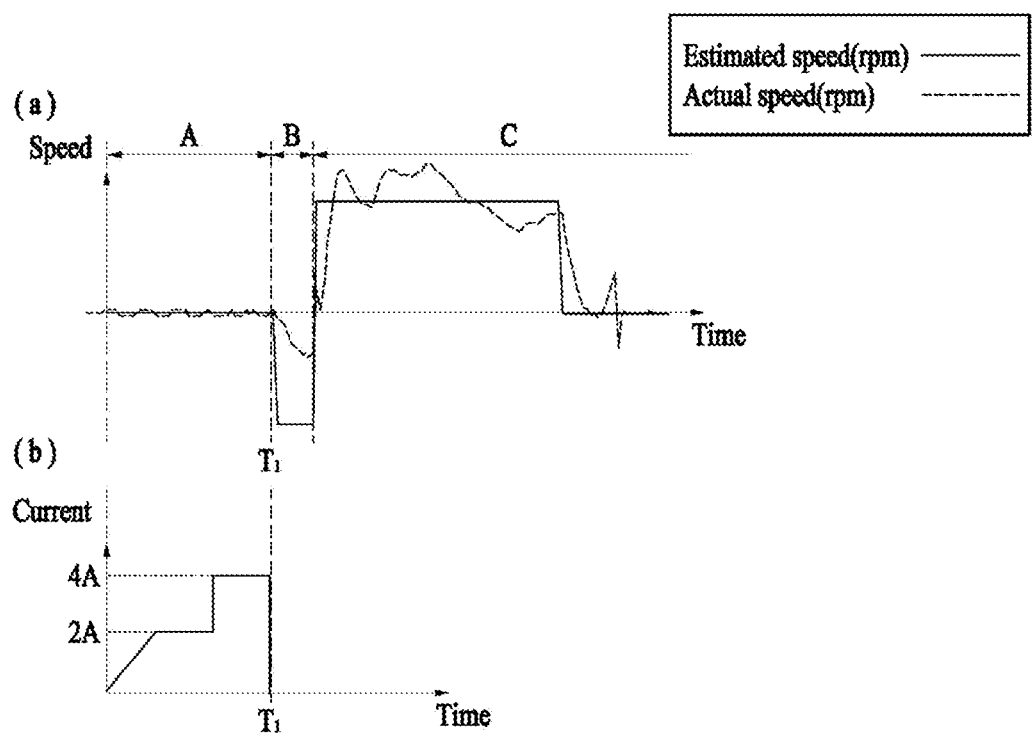
FIG. 4 is a diagram for describing an operation of a motor according to a driving start command for the motor according to various example embodiments.
Figure 5:
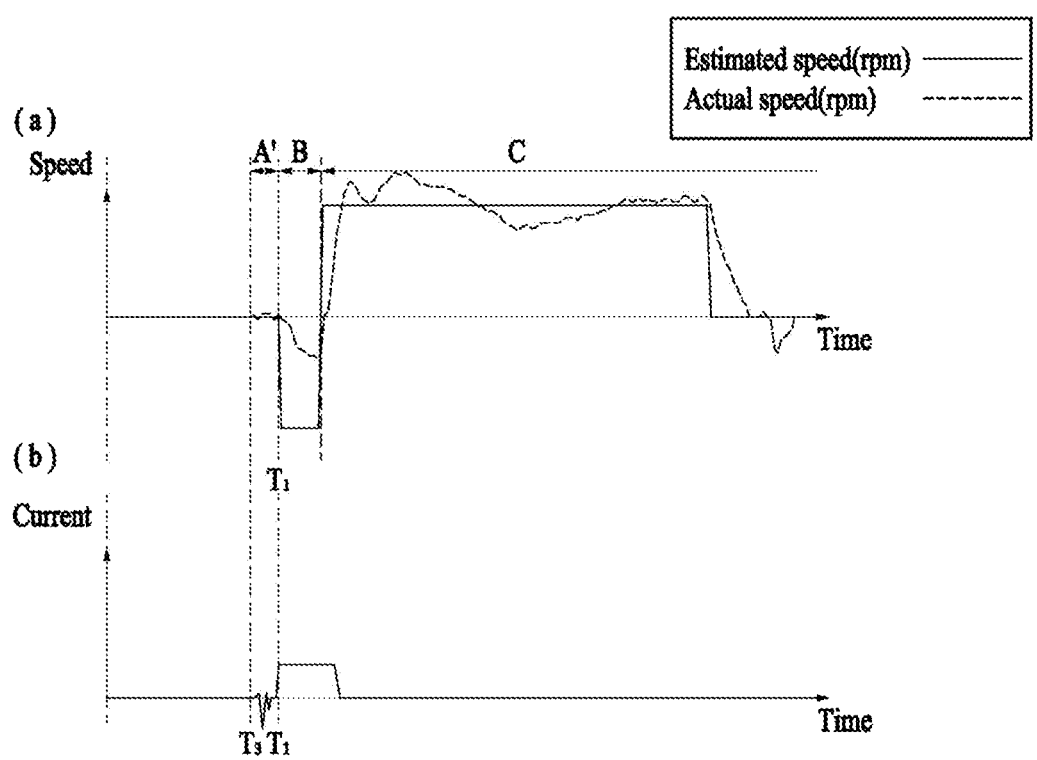
FIG. 5 is a diagram for describing an operation of a motor according to a driving start command for the motor according to various example embodiments.

FIGS. 4 and 5 are diagrams for describing an operation of a motor according to a driving start command for the motor according to various example embodiments.

Referring to FIGS. 4 and 5, a motor control apparatus (for example, the motor control apparatus 200 of FIG. 2) according to various example embodiments may correspond to a sensorless motor control apparatus that drives a motor even without including a separate sensor by estimating initial state information of the motor in a method of applying a predetermined input signal to the motor instead of using a specific sensor to detect an initial state of the motor and checking a response signal for the predetermined input signal.

According to various example embodiments, the motor control apparatus may control the driving of the motor through an inverter part (see the inverter part 220 of FIG. 2) in a method of first checking initial state information of the motor in section A (see FIG. 4) or section A' (see FIG. 5) as a driving start command for the motor is input, and using a pendulum energy in section B (see FIGS. 4 and 5) to perform a swing operation for driving the motor, and then controlling the motor to substantially rotate and start in section C (see FIGS. 4 and 5).

Referring to FIG. 4, in section A, instead of detecting an initial position of the motor, the motor control apparatus according to an example embodiment may align the initial position of the motor by applying a predetermined input signal to a specific position of the motor so that the motor is aligned to the specific position, and estimate the corresponding position as the initial position of the motor. In addition, the motor control apparatus may estimate an initial parameter (for example, a stator resistance) of the motor using voltage and current information of the motor at two time points while performing the initial position alignment operation. For example, the motor control apparatus may align the initial position of the motor by applying an input current (for example, a DC current having magnitudes of 2 ampere (A) and 4 A) in a specific direction for a predetermined period of time $T_1$. In particular, the motor control apparatus may set the applied input current to have different magnitudes, and estimate an initial parameter (for example, a stator resistance) of the motor on the basis of the input current and a response voltage corresponding to each input current magnitude.

Meanwhile, the period of time $T_1$ (for example, 2.5 seconds to 3.5 seconds) required to check the initial state of the motor in FIG. 4 or to align the initial position of the motor may require a slightly longer period of time than a period of time $T_1$ to $T_3$ (for example, 0.2 seconds to 0.4 seconds) required to check (for example, estimating the motor position and/or resistance) the initial state of the motor in FIG. 5 according to another example embodiment to be described below. In particular, as the inertia of an object (for example, a washing tub or a drum) to which power is to be transmitted using the motor increases, the required period of time $T_1$ is further increased, and thus user dissatisfaction may occur due to the delay of a waiting time from a time point when the driving start command is applied to the apparatus (for example, a laundry treatment apparatus or a motor control apparatus included in the laundry treatment apparatus) until a time point at which actual driving starts.

Meanwhile, referring to FIG. 5, a motor control apparatus according to an example embodiment of the present disclosure may not perform the motor alignment operation performed in the motor control apparatus of FIG. 4, instead, control the driving of a motor by estimating initial state information (for example, a position of the motor and/or a parameter (for example, a resistance) of the motor) of the motor in a method of applying an input signal of a specific pattern to the motor and checking a response signal corresponding to the input signal.

For example, the motor control apparatus may apply an input voltage of a specific pattern to the motor, check a response current corresponding to the input voltage to estimate a position of the motor (for example, a position of the rotor), and/or estimate a parameter (for example, a stator resistance) of the motor.

For example, the input voltage applied to the motor at least may include a plurality of sub-pattern signals sequentially applied to different positions. For example, each of the plurality of sub-pattern signals may correspond to a sine wave input voltage signal of one period having the same magnitude (amplitude). The sub-pattern signals may not be continuously applied and may have a predetermined waiting time whenever each sub-pattern signal is applied. The motor control apparatus (for example, the controller 210 of FIG. 2) may estimate a current (initial) position of the motor according to a direction (or phase) in which the sub-pattern signal, which corresponds to a sub-response signal having the largest response current magnitude or the largest response current integral value among sub-response signals for the respective sub-pattern signals, is applied.

Meanwhile, the motor control apparatus according to an example embodiment may include at least one specific sub-pattern signal (for example, a second sub-pattern signal) having a different magnitude (for example, amplitude) among the plurality of sub-pattern signals, and may estimate a parameter (for example, a resistance) value of the motor by using the specific sub-pattern signal. In addition, the motor control apparatus according to another example embodiment may estimate the parameter value of the motor using merely the plurality of sub-pattern signals having the same magnitude and a response current corresponding thereto, even though the second sub-pattern signal having a magnitude different from those of the plurality of sub-pattern signals is not included.

As such, according to the motor control apparatus described with reference to FIG. 5, since the position of the motor is estimated in the method of applying predetermined sub-pattern signals without aligning the initial position of the motor, it is possible to obtain an effect that is substantially similar to that of the motor control apparatus described in FIG. 4 during the period of time $T_1$ to $T_3$, which is much less than the period of time required to align the motor position.

Figure 6:
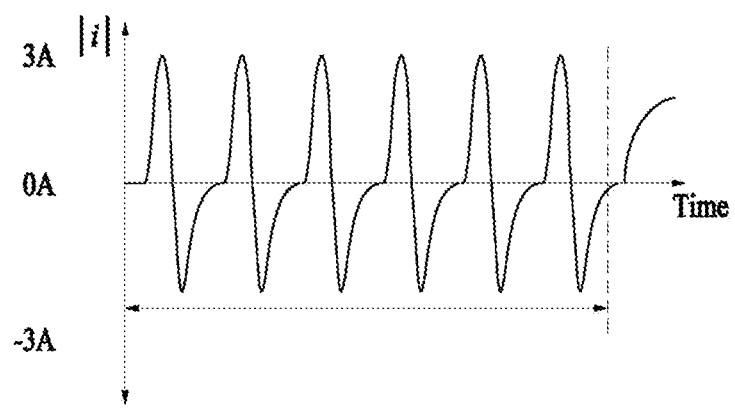
FIG. 6 is a graph schematically illustrating a response signal according to an input signal applied to a motor according to an example embodiment of the present disclosure.

FIG. 6 is a graph schematically illustrating a response signal according to an input signal applied to a motor according to an example embodiment of the present disclosure.

Referring to FIG. 6, when a driving start command for a motor is input, in order to check initial state information of the motor, a motor control apparatus (for example, the motor control apparatus 200 of FIG. 2) according to an example embodiment may control an inverter part to apply an input signal (for example, an input voltage) of a specific pattern before driving the motor.

In addition, the motor control apparatus may check a response signal (for example, a response current i) according to the application of the input signal, and estimate predetermined information related to an initial state (for example, a rotor position) of the motor.

According to various example embodiments, the input signal of a specific pattern applied to the motor may include a plurality of sub-pattern signals having different phases and sequentially applied. For example, each of the sub-pattern signals may be sequentially applied to a specific position of the motor with a predetermined time interval (for example, 10 milliseconds (ms) to 15 ms). For example, each sub-pattern signal may be sequentially applied to the motor at a predetermined time interval in a method in which a response current according to the sub-pattern signal applied just before becomes zero, and then the next sub-pattern signal is applied. Meanwhile, since the sub-pattern signals are applied to different positions of the motor in different phases from each other, a phase of a composite magnetic flux of the motor may be sequentially changed according to the phases of the sub-pattern signals.

For example, the plurality of sub-pattern signals may each include at least one of, for example, a square wave, a half wave, a pulse, or a sine wave. Among these, according to an example embodiment, the motor control apparatus may include a sine wave signal of one period as the sub-pattern signal. When each of the sub-pattern signals corresponds to a sine wave voltage signal of one period, a sub-response signal corresponding thereto may also be represented as a sine wave current signal of one period, as shown in FIG. 6. Since the sine wave sub-pattern signal of one period generates torque in a positive direction and a negative direction at a specific position, an average torque may become zero in one period, so that a torque ripple that may be generated when the input signal is applied may be minimized as compared to an input signal of another pattern (for example, a square wave, a half wave, a pulse, or the like).

Meanwhile, according to an example embodiment, the input signal at least may include a plurality of sub-pattern signals (for example, first to sixth signals of FIG. 7) sequentially applied to the motor in the same magnitude and different phases (or in different directions). The motor control apparatus (for example, the controller 210) may estimate a position of a rotor of the motor according to a phase of any one sub-pattern signal among the plurality of sub-pattern signals on the basis of a pattern of a response current i corresponding to each of the sub-pattern signals applied to the motor in different phases. For example, the position of the rotor may mean a position (or direction) toward an N pole of at least one magnet included in a stator.

For example, the motor control apparatus may estimate the position of the rotor on the basis of the maximum magnitude or integral value of a response signal (for example, a response current signal) corresponding to each of the sub-pattern signals (for example, an input voltage signal). For example, the motor control apparatus may estimate a position, to which a pattern signal corresponding to the signal having the largest current magnitude or the largest current integral value is applied, as a current (initial) position of the motor (for example, a stator).

As described above, the motor control apparatus may estimate the current (initial) position of the motor according to any one of positions of the motor, to which the sub-pattern signals are applied. Accordingly, the motor control apparatus may be set so that all the sub-pattern signals are applied to the positions, which are spaced apart from each other by the same interval (or an angle), on the motor.

For example, when the input signal includes a total of six sub-pattern signals, the sub-pattern signals may be applied to have a phase difference of about 60°. When the input signal includes a total of 12 sub-pattern signals, the sub-pattern signals may be applied to positions so as to each have a phase difference of about 30°, and a current (initial) position of the motor may be estimated according to any one of the positions to which the sub-pattern signals are applied. In this case, the position may be more precisely estimated than the case of estimating the position of the motor using the six sub-pattern signals, but a period of time required for estimating the positions may be further increased.

Meanwhile, as the sub-pattern signals (input voltage signals) are applied to the motor, a rotational torque may be generated in the motor, and accordingly, unnatural vibrations or noises may likely be caused.

Thus, the motor control apparatus according to various example embodiments of the present disclosure may control such that an order in which the sub-pattern signals having respective phases are applied according to a specified method in order to minimize the generation of rotational torque caused by the application of the sub-pattern signals.

Furthermore, the motor control apparatus according to various example embodiments of the present disclosure may control such that each position to which the input signal is applied is determined on the basis of predetermined data (for example, position information of the motor acquired in a state in which the driving of the motor is stopped) in order to estimate the position of the motor more accurately.

Meanwhile, according to another example embodiment, the input signal of a specific pattern applied to the motor may further include a second sub-pattern signal (s) having a magnitude different from those of the sub-pattern signals described above. For example, the second sub-pattern signal (s) at least may include a sub-pattern signal having a magnitude different from those of the sub-pattern signals applied for estimating the position of the motor. For example, the motor control apparatus may estimate a parameter (for example, a stator resistance) value of the motor using the second sub-pattern signal (s). The second sub-pattern signal (s) used for estimating the parameter value of the motor may be applied before or after the above-described sub-pattern signals used for estimating the initial position of the motor, the motor control apparatus according to an example embodiment may prevent the performance of estimating the resistance from being degraded due to minute movements that may occur according to the application of the remaining sub-pattern signals other than the second sub-pattern signal (s) by applying the second sub-pattern signal (s) before the remaining sub-pattern signals. For example, according to an example embodiment, the second sub-pattern signal (s) may include two sub-pattern signals of different magnitudes having the same phase.

Figure 7:
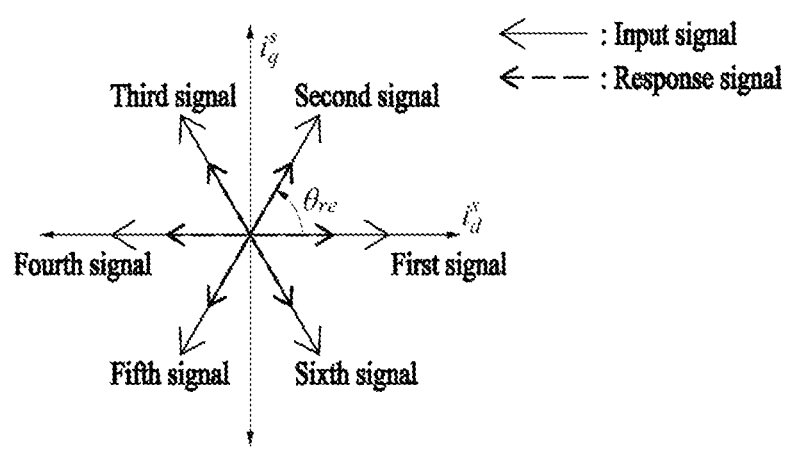
FIG. 7 is a diagram for describing a method of applying an input signal by the motor control apparatus according to an example embodiment.
Figure 8:
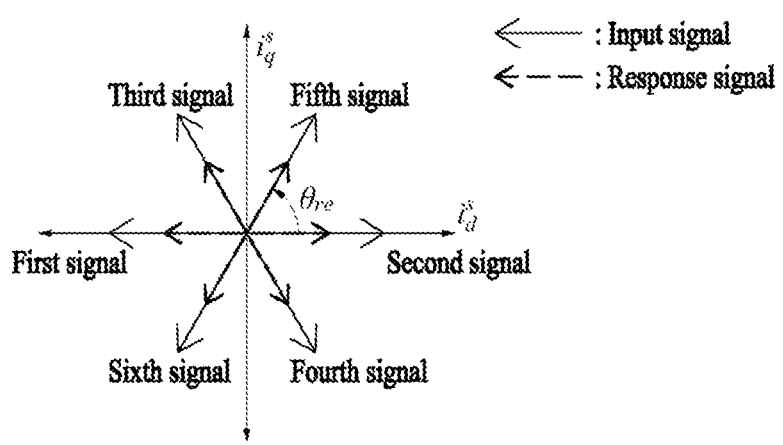
FIG. 8 is a diagram for describing a method of applying an input signal by the motor control apparatus according to an example embodiment.
Figure 9:
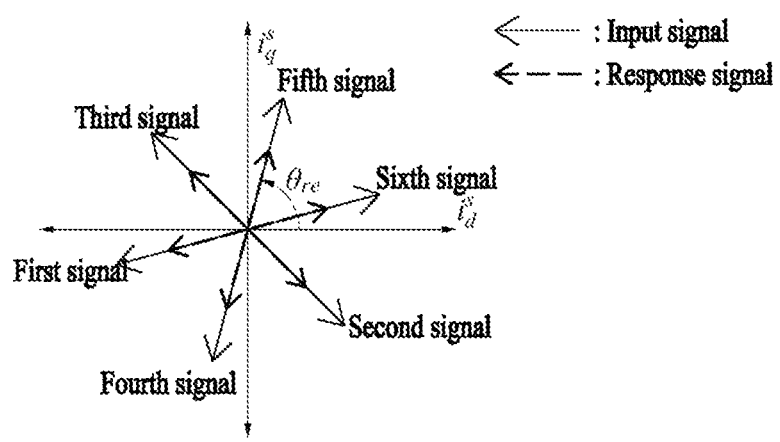
FIG. 9 is a diagram for describing a method of applying an input signal by the motor control apparatus according to an example embodiment.

FIGS. 7 to 9 are diagrams for describing positions and an application order of input signals of a motor control apparatus according to various example embodiments.

Referring to FIGS. 7 to 9, the motor control apparatus according to various example embodiments may include a plurality of sub-pattern signals as an input signal (for example, an input voltage) of a specific pattern applied to the motor.

For example, each of the sub-pattern signals may correspond to a sine wave voltage signal of one period, and response signals (for example, response currents) corresponding to the input signals may also be output as current signals each having a form of a sine wave of one period. For example, each of the sub-pattern signals may correspond to a sine wave having a frequency of about 50 hertz (Hz) and a magnitude of 30 V or less. As another example, the sub-pattern signals may be applied in a predetermined form in which sub-response current signals each having a sine wave form with a frequency of about 50 Hz and a magnitude of 3 Å or less may be output. For example, each of the sub-pattern signals may correspond to a signal having substantially the same magnitude (for example, an amplitude and a frequency). The sub-pattern signals may be sequentially applied at a predetermined time interval (for example, 10 ms to 15 ms) and in different phases (or directions) to estimate a current position of the rotor of the motor.

In FIG. 7, in the motor control apparatus according to an example embodiment, six sub-pattern voltage signals (for example, first to sixth signals) may be sequentially applied to specific positions of the motor to estimate the initial position of the motor, and six sub-response current signals detected according thereto may be checked.

According to an example embodiment, the motor control apparatus may sequentially apply the respective sub-pattern voltage signals at a phase interval of about 60° in a specific direction (for example, a counterclockwise or clockwise direction) with respect to a rotation shaft of the motor.

In this case, rotational torque may be applied to the motor in one direction on the basis of the applied sub-pattern voltage signal, or an unstable state, such as the motor may rotate, vibrations may occur, or noises may be generated, may be caused.

Meanwhile, in FIG. 8, a motor control apparatus according to another example embodiment may set an application order (or an applied phase (or direction)) of each of the sub-pattern voltage signals according to a specified method in order to prevent the rotational torque from being applied to the motor in one direction as described above and to partially offset the rotational torque according to each of the sub-pattern voltage signals (for example, the first to sixth signals).

For example, a second signal applied immediately after a first signal is applied may be applied in a direction (for example, at 0°) opposite to a direction in which the first signal is applied (for example, at 180°) with respect to the rotation shaft of the motor. That is, the first signal and the second signal may have a phase difference of about 180° (for example, at 170° to 190°).

For example, a third signal applied immediately after the second signal is applied may be applied in a direction having a phase difference of about 120° (for example, at 110° to 130°) from the direction in which the second signal is applied with respect to the rotation shaft of the motor. In addition, a fourth signal applied next to the third signal may be applied in a direction having a phase difference of about 180° (for example, at 170° to 190° from the direction in which the third signal is applied with respect to the rotation shaft of the motor. In the same method, a fifth signal applied after the fourth signal is applied may be applied in a direction having a phase difference of about 120° (for example, at 110° to 130°) from the fourth signal, and a sixth signal applied after the fifth signal is applied may be applied in a direction having a phase difference of about 180° (for example, 170° to 190°) from the fifth signal.

That is, the first to sixth signals may be sequentially applied to positions corresponding to 180°, 0°, 120°, 300°, 60°, and 240°, or sequentially applied to positions corresponding to 180°, 0°, 240°, 60°, 300°, and 120°.

In other words, each of the sub-pattern signals may be applied to the motor in a manner in which the sub-pattern signal, which is applied directly before the specific sub-pattern signal is applied, is applied at a position having an angle difference of about 120° or about 180° from the position to which the specific sub-pattern signal is applied.

Meanwhile, in FIGS. 7 and 8, the direction, in which the specific sub-pattern signal (for example, the first signal) applied first among the plurality of sub-pattern signals applied to the motor is applied, is arbitrarily determined by 0° or 180°, and then merely the position, to which the next applied sub-pattern signal is applied, is considered on the basis of the previous sub-pattern signal, but, the motor control apparatus according to an example embodiment of the present disclosure may determine the position to which the first signal is applied on the basis of stop position information of the rotor when the driving of the motor is stopped.

For example, the motor control apparatus according to an example embodiment may estimate a stop position of the motor (for example, the rotor) when the driving of the motor is stopped, store the corresponding information in a memory (not shown), and estimate an initial position of the motor using the stop position information when the driving of the motor is resumed.

In the motor control apparatus according to an example embodiment, when a driving stop command for the motor is input (for example, when washing is completed or when a user inputs a command to stop washing, or the like), a predetermined input current may be applied to a position corresponding to the (expected) stop position of the rotor in response that a rotation speed of the rotor of the motor is less than or equal to a specified magnitude. Thus, the motor control apparatus may align the motor at a specified stop position when the driving of the motor is stopped. In addition, information related to the aligned stop position may be stored and used when the driving of the motor is resumed.

For example, in FIG. 9, directly before the driving start command for the motor at a current time point is input, the motor control apparatus may check information estimated as the stop position of the rotor when the driving of the motor is stopped. For example, in FIG. 9, the stop position of the rotor may correspond to a direction in which the sixth signal is directed.

The motor control apparatus may determine to apply a pattern signal (that is, the first signal) to be applied initially in a direction corresponding to a direction opposite to the stop position (for example, the position to which the sixth signal is applied) of the rotor with respect to the rotation shaft of the motor.

Next, the motor control apparatus may apply a next pattern signal (that is, the second signal) with a phase having an angular difference of about 120° or about 180° from the phase (or direction) with which the first signal is applied, and determine a phase (or direction) with which a pattern signal to be applied next is applied in a similar manner.

When the above-described method is used, the motor control apparatus may estimate information about an initial position of a motor according to a consistent condition when the driving of the motor is resumed after the motor is stopped, so that a position estimation performance may be improved.

Further, the motor control apparatus may prevent the movement of the motor caused by the movement of cloth or the rolling of water in a stage, in which the driving of the motor is stopped, by applying an input current to the motor in the motor stop stage, and may improve the unnatural vibration related to the starting of the motor by aligning a rotor of the motor to a specified position.

FIG. 10 is a schematic flowchart of a motor control method according to an example embodiment of the present disclosure.

Referring to FIG. 10, in operation 410, the motor control apparatus according to an example embodiment may check a stop position of the rotor when the driving of the motor is stopped.

For example, the motor control apparatus may align a position of the motor (for example, the rotor) in a method of applying a predetermined input signal (for example, an input current) to the motor according to a driving stop command for the motor, and store information related to the stop position of the motor in a memory.

For example, the motor control apparatus may align the position of the motor by applying the input signal in a state in which the motor is rotated below a specific speed according to the driving stop command for the motor. Alternatively, when the motor is no longer rotated, that is, when a slight vibration occurs in the rotor of the motor, the position of the rotor may be aligned by applying the input signal. For example, the input signal applied to align the stop position of the rotor may be applied to a specified reference position, or may be applied to a specific position at which the motor is expected to be stopped.

As another example, instead of applying the predetermined input signal for aligning the position of the rotor, the motor control apparatus may store stop position information by estimating the stop position of the rotor in a different method.

In operation 420, the motor control apparatus according to an example embodiment may check (or receive) the driving start command for the motor, and prepare the driving of the motor in response to the driving start command. For example, the motor control apparatus may perform an operation of checking a current (initial) state information of the motor before starting the motor.

In operation 430, the motor control apparatus may apply a predetermined input signal to the motor to check state information of the motor.

For example, the motor control apparatus may check the stop position information of the motor before the driving start command for the motor is input. For example, the motor control apparatus may check information about a state (that is, the stop position of the rotor) in which the motor is stopped after the motor has been recently driven, and estimate the current (initial) position of the motor on the basis of the information.

For example, the motor control apparatus may determine a direction (or a phase of the input signal), in which the input signal is to be applied, on the basis of the stop position (or direction) of the rotor. For example, the motor control apparatus may set the stop position of the rotor in a predetermined reference direction for applying the input signal.

For example, the input signal (for example, a voltage signal) applied to the motor may include a plurality of sub-pattern signals each corresponding to a sine wave of one period. The motor control apparatus may determine a direction, in which a first sub-pattern signal is initially applied among the plurality of sub-pattern signals, on the basis of the stop position of the rotor. For example, the motor control apparatus may apply the input signal (for example, the first sub-pattern signal) in the same direction or opposite direction to the stop position of the rotor. In addition, the motor control apparatus may determine directions, in which the remaining sub-pattern signals are applied next, on the basis of the direction in which the first sub-pattern signal is applied.

For example, when a total of six sub-pattern signals are included as the input signal, the motor control apparatus may determine a direction, in which each sub-pattern signal is applied, so that the sub-pattern signal applied directly before and the sub-pattern signal applied thereafter have a phase difference of 120° or more (for example, about 120° or about 180°. As another example, when a total of 12 sub-pattern signals are included as the input signal, the motor control apparatus may set a direction, in which each sub-pattern signal is applied, so that the sub-pattern signal applied directly before and the sub-pattern signal applied thereafter have a phase difference of 150° or more (for example, about 150° or about 180°).

As such, the motor control apparatus may determine phases (or directions) with which sub-pattern signals are to be applied, on the basis of a stop position of a rotor when the motor is previously driven, and may lead to minimize the generation of rotational torque by applying the sub-pattern signals to the motor according to the determined phases.

Next, in operation 440, the motor control apparatus according to an example embodiment may estimate initial state information of the motor, for example, the current (initial) position of the motor, on the basis of a response signal (for example, a response current) output according to the input signal (for example, an input voltage) applied to the motor, and may start the driving of the motor on the basis of the estimated information.

For example, the motor control apparatus may estimate the current (initial) position of the motor by applying a plurality of sub-pattern signals having different phases and the same magnitude and checking respective sub-response signals corresponding to the plurality of sub-pattern signals, and checking a phase corresponding to the sub-response signal having the largest amplitude or integral value of the corresponding sub-response signal.

The above-described example embodiments of the motor control apparatus and the motor control method according to the present disclosure may be applied to and implemented on a motor control apparatus provided in a motor, for example, an inverter apparatus for controlling the motor, a motor including the same, a control method for the motor, or the like. In particular, the example embodiments may be effectively applied to and implemented on a control apparatus, a control system, and a control method for controlling an initial operation of a motor, a control apparatus a control system, and a control method for aligning a position of a motor, a control apparatus, a control system, a control method for detecting a position of a motor, or the like. In addition, the example embodiments may also be effectively applied to and implemented on a compressor control apparatus provided in a compressor including a motor, for example, an inverter apparatus for controlling a motor of a compressor, a compressor including the same, a control method for the compressor, or the like. However, techniques disclosed herein are not limited thereto, and may also be applied to and implemented on all motor control apparatuses, motor control systems and motor control methods, home appliances including the motor, control apparatuses for home appliances including the motor, and control systems and control methods for home appliances including the motor to which the technical concept of the present disclosure is applicable.

Further, the term " . . . er (or)" and " . . . part," mentioned herein may be a hardware component, such as a processor or circuit, and/or a software component executed by the hardware configuration, such as a processor.

According to various example embodiments of the present disclosure, since a separate expensive sensor for detecting an initial position of a motor is not required, manufacturing cost can be reduced and unnecessary design can be omitted.

Further, since it does not take too much time to align an initial position of a motor even with sensorless control, a net acting ratio can be improved, and information related to a washing operation can be provided to a user in a short waiting time.

Further, the matter can be suppressed in which a motor moves according to the movement of cloth or the rolling of water in an operation of stopping the driving of the motor.

Further, a position of a motor can be estimated more accurately and consistently by estimating the position of the motor at an operation before resuming the driving of the motor on the basis of stop position information of a rotor.

Further, a motion or noise of a motor caused by a signal applied to determine an initial position of the motor can be minimized, and a position estimation error of the motor can be minimized.

An aspect provides a motor control apparatus and a motor control method capable of effectively estimating an initial position of a motor (rotor) in a short time before starting the motor.

The technical matter to be solved by the example embodiments is not limited to the above-described technical matters, and other technical matters which are not described may be inferred from the following example embodiments.

According to an aspect, there is provided a motor control apparatus including an inverter part configured to convert direct current (DC) power into alternating current (AC) power and provide the AC power to a motor, and a controller configured to control driving of the motor by using the inverter part, and the controller may check a stop position of a rotor in previous driving of the motor, and control the inverter part to apply an input signal of a specific pattern to the motor according to a start of driving the motor. For example, the phase of the input signal of the specific pattern may be determined on the basis of the stop position of the rotor when the motor is previously driven.

According to another aspect, there is also provided a motor control method including, when a driving start command for a motor is input, before the motor is driven, applying an input voltage of a specific pattern to the motor on the basis of a stop position of a rotor when driving of the motor is stopped, estimating a current position of the rotor on the basis of a response current corresponding to the input voltage, and driving the motor on the basis of the estimated current position of the rotor.

Specific details of other example embodiments are included in the detailed descriptions and drawings.

Effects of the present disclosure will not be limited to the above-mentioned effects and other unmentioned effects will be clearly understood by those skilled in the art from the following claims.

The above description of the present disclosure is merely exemplary, and it will be understood by those skilled in the art that various modifications may be made without departing from the scope of the present disclosure and without changing essential features. Therefore, the example embodiments described above need to be understood as being illustrative in all aspects instead of limiting. For example, each component described as a single entity may be distributed and implemented, and components described as being distributed may also be implemented in a combined form.

The scope of the present disclosure will be defined by the following claims rather than the above detailed description, and all changes and modifications derived from the meaning and the scope of the claims and equivalents thereof need to be understood as being included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control apparatus, comprising:
an inverter configured to convert direct current (DC) power into alternating current (AC) power, and to provide the AC power to a motor; and
a controller configured to control driving of the motor by controlling the inverter, the controller configured to:
identify a stop position of a rotor when the driving of the motor is stopped based on a driving stop command from a previous driving of the motor; and
control the inverter to apply, to the motor, an input signal having a specific pattern in order to identify an initial state information of the motor when a driving start command is input to the motor,
wherein a phase of the input signal having the specific pattern is determined based on a direction corresponding to the stop position of the rotor.

2. The motor control apparatus of claim 1, wherein the controller is configured to control the inverter to provide a driving control signal for driving the motor according to a current position of the rotor, which is estimated based on a response signal corresponding to the input signal.

3. The motor control apparatus of claim 1, wherein the input signal having the specific pattern includes a plurality of sub-pattern signals having different phases and being sequentially applied.

4. The motor control apparatus of claim 3, wherein the controller is configured to determine a phase of a first sub-pattern signal, initially applied from among the plurality of sub-pattern signals, based on the stop position of the rotor.

5. The motor control apparatus of claim 4, wherein the controller is configured to determine phases of the remaining sub-pattern signals, among the plurality of sub-pattern signals, based on the phase of the first sub-pattern signal.

6. The motor control apparatus of claim 4, wherein the phase of the first sub-pattern signal is determined to have a same direction or an opposite direction as compared to the stop position of the rotor with respect to a rotation shaft of the motor.

7. The motor control apparatus of claim 3, wherein the controller is configured to determine a phase of the sub-pattern signal to be applied next by having a phase difference of 120° or 180° from a phase of the sub-pattern signal that is directly applied before the sub-pattern signal to be applied next.

8. The motor control apparatus of claim 3, wherein the controller is configured to estimate a current position of the rotor based on magnitudes of sub-response signals respectively corresponding to the plurality of sub-pattern signals, and based on a phase of the sub-pattern signal corresponding to the sub-response signal having a largest magnitude.

9. The motor control apparatus of claim 1, wherein the stop position of the rotor corresponds to a position of an N pole of a magnet included in the rotor.

10. The motor control apparatus of claim 1, wherein in response to receiving a driving stop command for the motor, the controller is configured to control the inverter to apply a predetermined input current corresponding to the stop position of the rotor when a rotation speed of the rotor is less than or equal to a predetermined magnitude.

11. The motor control apparatus of claim 3, wherein each of the plurality of sub-pattern signals corresponds to a sine wave signal of one period.

12. The motor control apparatus of claim 1, wherein the controller is configured to estimate a current position of the rotor and a resistance of the motor based on a response signal corresponding to the input signal.

13. A motor control method of a motor control apparatus that includes an inverter configured to output AC power to a motor, and a controller configured to control the inverter to control driving of the motor, the motor control method comprising:
    identifying a stop position of a rotor when the driving of the motor is stopped based on a driving stop command from a previous driving of the motor;
    receiving a driving start command for the motor; and
    controlling the inverter to apply, to the motor, an input signal having a specific pattern in order to identify an initial state information of the motor corresponding to the driving start command,
    wherein a phase of the input signal having the specific pattern is determined based on a direction corresponding to the stop position of the rotor.

14. The motor control method of claim 13, further comprising:
    providing a driving control signal for driving the motor based on a current position of the rotor, which is estimated based on a response signal corresponding to the input signal.

15. The motor control method of claim 13, wherein the input signal includes a plurality of sub-pattern signals sequentially applied to different positions, and
    the controlling of the inverter to apply the input signal includes:
    determining a position to apply a first sub-pattern signal, initially applied from among the plurality of sub-pattern signals, based on the stop position of the rotor; and
    determining positions to apply the remaining sub-pattern signals based on the determined position of the first sub-pattern signal.

16. The motor control method of claim 13, further comprising:
    when a driving stop command for the motor is received, applying a predetermined input current to a position corresponding to the stop position of the rotor when a rotation speed of the rotor is less than or equal to a designated magnitude.

17. The motor control method of claim 15, wherein the controlling of the inverter to apply the input signal includes determining a position for each of the sub-pattern signals such that the sub-pattern signal that is applied directly before and the sub-pattern signal to be applied next have a phase difference of 120° or more.

18. The motor control method of claim 15, wherein each of the plurality of sub-pattern signals corresponds to a sine wave signal of one period.

19. The motor control method of claim 16, wherein the plurality of sub-pattern signals have substantially a same amplitude and frequency.

20. The motor control method of claim 13, further comprising:
    providing a driving control signal for driving the motor based on a current position of the rotor and a resistance of the motor, which are estimated based on a response signal corresponding to the input signal.

* * * * *